(12) United States Patent
Hsiao et al.

(10) Patent No.: US 7,505,226 B2
(45) Date of Patent: Mar. 17, 2009

(54) METHOD AND APPARATUS FOR PROVIDING A POLE TIP STRUCTURE HAVING A SHAPE FOR PREVENTING OVER SATURATION OF THE POLE TIP STRUCTURE

(75) Inventors: Wen-Chien David Hsiao, San Jose, CA (US); Vladimir Nikitin, Campbell, CA (US)

(73) Assignee: Hitachi Global Storage Technologies Netherlands BV (NL)

( * ) Notice: Subject to any disclaimer, the term of this patent is extended or adjusted under 35 U.S.C. 154(b) by 302 days.

(21) Appl. No.: 10/857,286

(22) Filed: May 28, 2004

(65) Prior Publication Data

US 2005/0264932 A1 Dec. 1, 2005

(51) Int. Cl.
*G11B 5/127* (2006.01)
(52) U.S. Cl. .............................. 360/125.47; 360/125.52
(58) Field of Classification Search .................. 360/119, 360/126, 117, 119.01, 119.02, 119.03, 125.06, 360/125.07, 125.08, 125.1, 125.11, 125.22, 360/125.23, 125.24, 125.25, 125.43–125.49, 360/125.56–125.62
See application file for complete search history.

(56) References Cited

U.S. PATENT DOCUMENTS

| | | | | |
|---|---|---|---|---|
| 5,828,533 A * | 10/1998 | Ohashi et al. | ................ | 360/126 |
| 6,301,076 B1 * | 10/2001 | Stageberg et al. | ........... | 360/126 |
| 6,407,885 B1 * | 6/2002 | Ahagon et al. | ............... | 360/126 |
| 6,466,415 B1 * | 10/2002 | Terunuma et al. | ........... | 360/317 |
| 6,525,902 B1 * | 2/2003 | Hu et al. | ...................... | 360/126 |
| 6,757,141 B2 * | 6/2004 | Santini et al. | ................ | 360/317 |
| 6,778,356 B2 * | 8/2004 | Kawai et al. | ................. | 360/126 |
| 6,829,819 B1 * | 12/2004 | Crue, Jr. et al. | ........... | 29/603.12 |
| 6,950,277 B1 * | 9/2005 | Nguy et al. | .................. | 360/119 |
| 2002/0024776 A1 * | 2/2002 | Sasaki et al. | ................. | 360/317 |
| 2003/0137771 A1 * | 7/2003 | Emilio Santini | ............ | 360/126 |
| 2003/0179498 A1 * | 9/2003 | Hsiao et al. | ................. | 360/126 |
| 2004/0233578 A1 * | 11/2004 | Gao | ............................ | 360/125 |

FOREIGN PATENT DOCUMENTS

JP 2005032396 A * 2/2005

* cited by examiner

*Primary Examiner*—Brian E Miller
*Assistant Examiner*—Adam B Dravininkas
(74) *Attorney, Agent, or Firm*—Merchant & Gould (57) ABSTRACT

A method and apparatus for providing a pole tip structure having a shape for preventing over saturation of the pole tip structure is disclosed. A cap layer having a tail structure for reducing the saturation of the cap layer is formed over the pole structure. The tail structure includes an angled surface that can vary between approximately 15° and 65°.

18 Claims, 8 Drawing Sheets

METHOD AND APPARATUS FOR PROVIDING A POLE TIP STRUCTURE HAVING A SHAPE FOR PREVENTING OVER SATURATION OF THE POLE TIP STRUCTURE

BACKGROUND OF THE INVENTION

1. Field of the Invention

This disclosure relates in general to magnetic storage systems, and more particularly to a method and apparatus for providing a pole tip structure having a shape for preventing over saturation of the pole tip structure.

2. Description of Related Art

There has been huge progress in the field of magnetic storage system technology in almost 50 years. Moreover, the rate of this progress is increasing year after year. Such success has made storage systems an important component of modern computers.

Some of the most important customer attributes of any storage system are the cost per megabyte, data rate, and access time. In order to obtain the relatively low cost of today's storage system compared to solid state memory, the customer must accept the less desirable features of this technology, which include a relatively slow response, high power consumption, noise, and the poorer reliability attributes associated with any mechanical system. On the other hand, magnetic storage systems have always been nonvolatile; i.e., no power is required to preserve the data, an attribute which in semiconductor devices often requires compromises in processing complexity, power-supply requirements, writing data rate, or cost.

Improvements in areal density have been the chief driving force behind the historic improvement in storage cost. In fact, the areal density of magnetic storage systems continues to increase. While nature allows us to scale down the size of each bit of information, it does not allow scaling to happen forever.

Today, as the magnetic particles that make up recorded data on a storage system become ever smaller, technical difficulties in writing and reading such small bits occur. Further, as areal density increases, the requirements put on head designs will change.

In a magnetic head, a read element and a write element are formed having an air bearing surface ABS, in a plane, which can be aligned to face the surface of the magnetic disk. The read element includes a first shield, a second shield, and a read sensor that is located within a dielectric medium between the first shield and the second shield. The most common type of read sensor used in the read/write head is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element is typically an inductive write element that includes the second shield that functions as a first pole for the write element and a second pole disposed above the first pole. The first pole and the second pole contact one another at a backgap portion, with these three elements collectively forming the yoke. The combination of a first pole tip portion and a second pole tip portion near the ABS are sometimes referred to as the ABS end 56 of the write element. Some write elements have included a pedestal that can be used to help define trackwidth and throat height. A write gap is formed between the first and second poles in the area opposite the back gap portion. The write gap is typically filled with a non-magnetic, electrically insulating material that forms a write gap material layer. A conductive coil passes through the yoke. The write head operates by passing a writing current through the conductive coil. Because of the magnetic properties of the yoke, a magnetic flux is induced in the first and second poles by write currents passed through the coil. The write gap allows the magnetic flux to fringe out from the yoke thus forming a fringing gap field and to cross the magnetic recording medium that is placed near the ABS.

A critical parameter of a magnetic write element is the trackwidth of the write element, which defines track density. For example, a narrower trackwidth can result in a higher magnetic recording density. The trackwidth is defined by the geometries in the ABS end of the yoke. For example, the trackwidth can be defied by the width of the pedestal or by the width of the second pole. Alternatively, in designs that have no pedestal at all it would be possible to define the trackwidth by the width of the first pole.

One of the factors that influence the performance of the recording head includes a throat height (TH). The throat height refers to a length (height) of a magnetic pole between an air bearing surface and an edge of an insulating layer for electrically isolating thin film coils for generating a magnetic flux. The air bearing surface refers to a surface of the thin film magnetic head facing a magnetic recording medium and is sometimes called a track surface. A reduction in the throat height is desired for the improvement in the performance of the recording head because the length of the bit cell is largely dictated by a length of the write gap or throat height. Moreover, to further improve the areal density at which information can be recorded and reliably read. This desire has lead to a trend toward shorter bit length along a magnetic recording track and a shrinking trackwidth. As mentioned above, narrow trackwidths are achieved by use of narrow pole tips at an air bearing surface (ABS) of the head.

A top pole is typically formed over the throat insulator. The use of two-piece pole structures facilitates the achievement of a submicron pole tip width at the ABS. A two-piece pole structure employs a first piece (pole tip or cap layer) having a very narrow width at the ABS, and a second pole piece connected to the first pole piece and extending to the back region of the head. Thus, the first pole piece defines the narrow trackwidth, and the second pole piece links through the coils. One issue with the cap layer is that it may be over saturated and lose the ability to focus the flux to the center of a track. This would degrade the on-track writability and the unfocused flux may also cause adjacent track interference.

It can be seen then that there is a need for a method and apparatus for providing a pole tip structure having a shape for preventing over saturation of the pole tip structure.

SUMMARY OF THE INVENTION

To overcome the limitations described above, and to overcome other limitations that will become apparent upon reading and understanding the present specification, the present invention discloses a method and apparatus for providing a pole tip structure having a shape for preventing over saturation of the pole tip structure.

The present invention solves the above-described problems by providing a cap layer having a tail structure for reducing the saturation of the cap layer formed over the pole structure. The tail structure includes an angled surface that can vary between approximately 15° and 65°.

A write head in accordance with the principles of the present invention includes a first write pole having a write pedestal, a second write pole disposed across a write gap from the pedestal of the first write pole and a cap formed on the pedestal of the first write pole in the write gap, the cap further defining the write gap and focusing write flux on a recording medium, wherein the cap includes a tail portion making a base of the cap wider than a top of the cap.

In another embodiment of the present invention, a magnetic storage system is provided. The magnetic storage system includes a magnetic storage medium having a plurality of tracks for recording of data and a magnetic sensor maintained in a closely spaced position relative to the magnetic storage medium during relative motion between the magnetic sensor and the magnetic storage medium, the magnetic sensor further including a write head including a first write pole having a write pedestal, a second write pole disposed across a write gap from the pedestal of the first write pole and a cap formed on the pedestal of the first write pole in the write gap, the cap further defining the write gap and focusing write flux on a recording medium, wherein the cap includes a tail portion making a base of the cap wider than a top of the cap.

In another embodiment of the present invention, a method for providing a pole tip structure having a shape for preventing over saturation of the pole tip structure is provided. The method includes forming a pole structure for a write head and forming, over the pole structure, a cap layer having a tail structure for reducing the saturation of the cap layer.

In another embodiment of the present invention, another write head is provided. This write head includes first means for carrying a write current, second means for carrying a write current, the second means and the first means being separated by a write gap and means, coupled to the first means, for defining the write gap and focusing write flux on a recording medium, wherein the means for defining and focusing includes means for reducing saturation at a bottom of the means for defining and focusing.

In another embodiment of the present invention, another magnetic storage system is provided. The magnetic storage system includes means for storing data and means, maintained in a closely spaced position relative to the means for storing, for reading and writing data on the means for storing during relative motion between the means for reading and writing data and the means for storing data, the means for reading and writing further including first means for carrying a write current, second means for carrying a write current, the second means and the first means being separated by a write gap and means, coupled to the first means, for defining the write gap and focusing write flux on a recording medium, wherein the means for defining and focusing includes means for reducing saturation at a bottom of the means for defining and focusing.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a pole tip structure having a shape for preventing over saturation of the pole tip structure. The present invention provides a cap layer having a tail structure for reducing the saturation of the cap layer formed over the pole structure. The tail structure includes an angled surface that can vary between approximately 15° and 65°.

Figure 1:
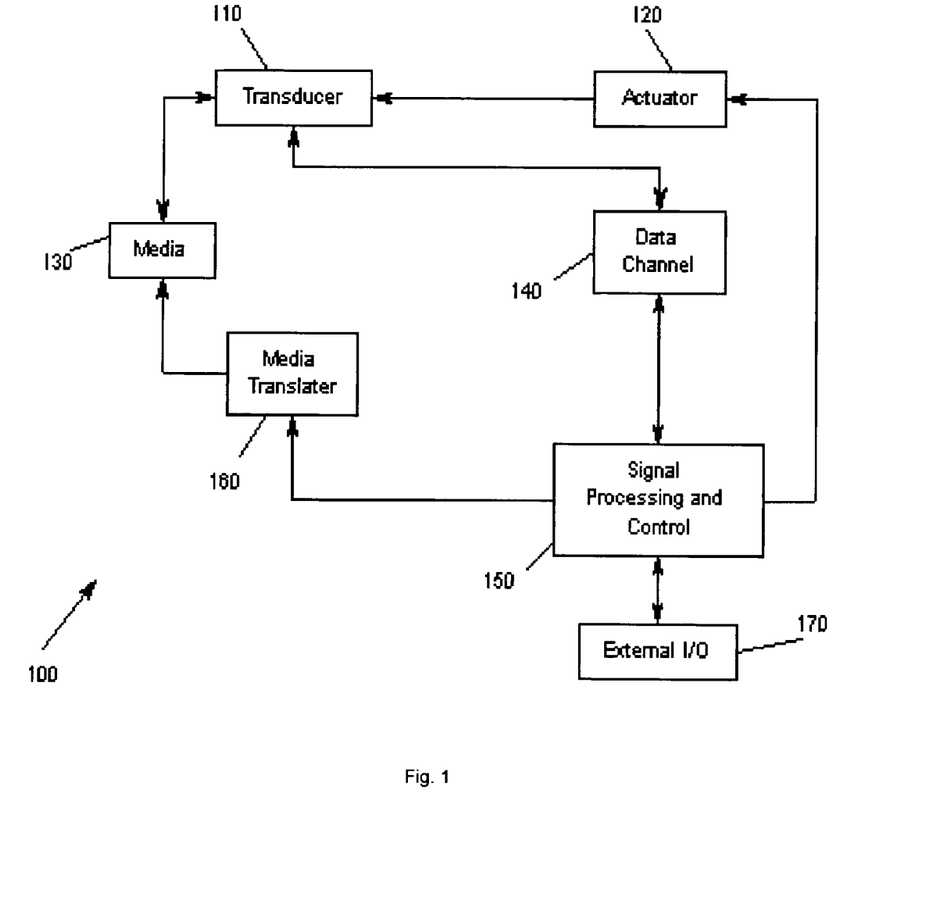
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
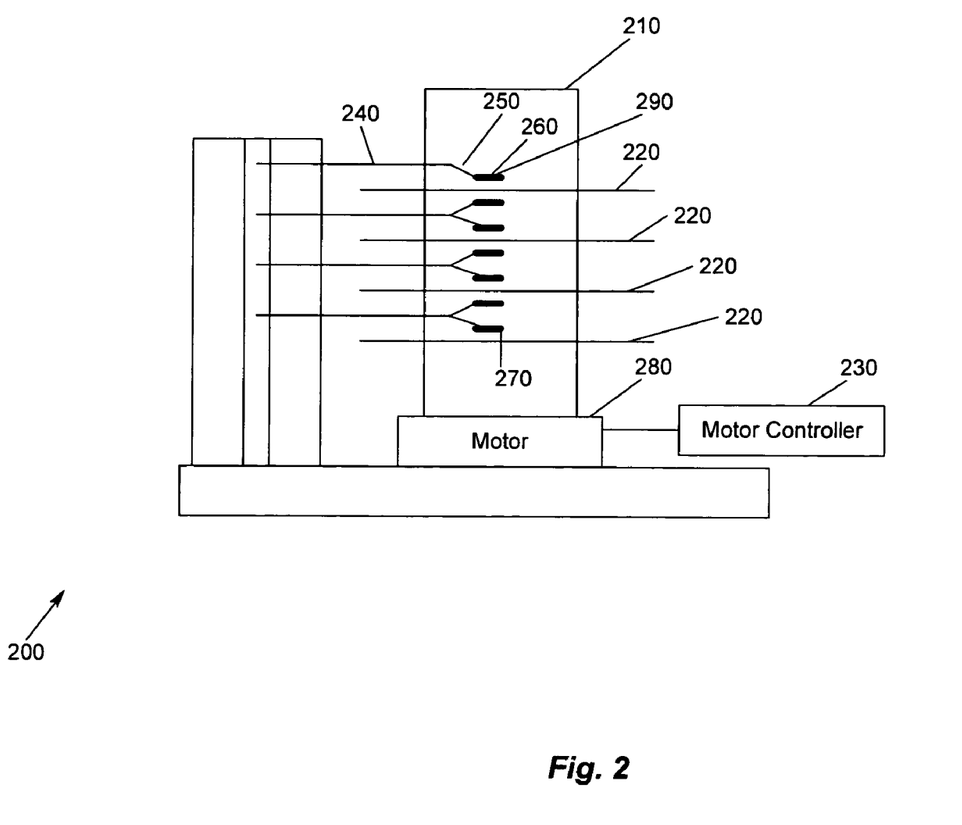
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
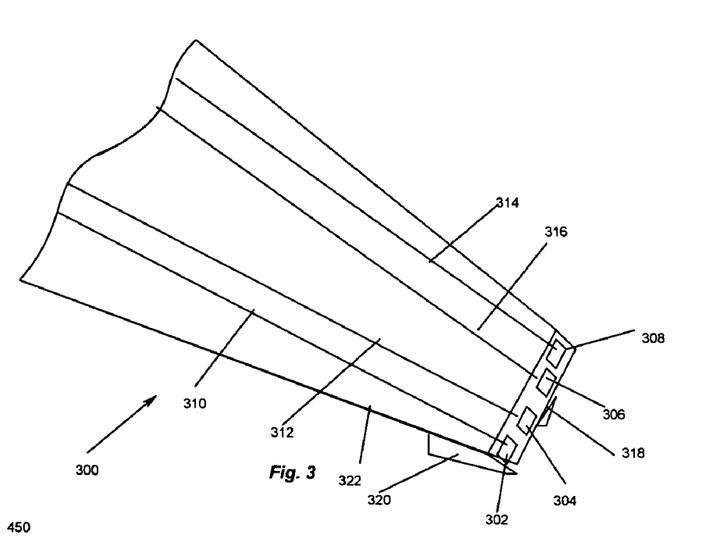
FIG. 3 illustrates a slider mounted on a suspension according to an embodiment of the present invention.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
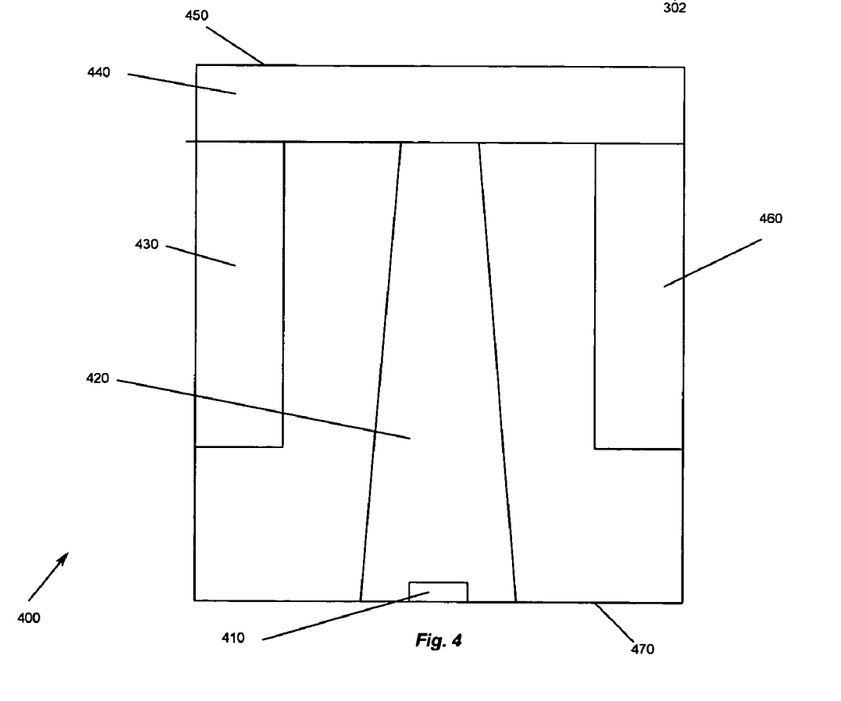
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
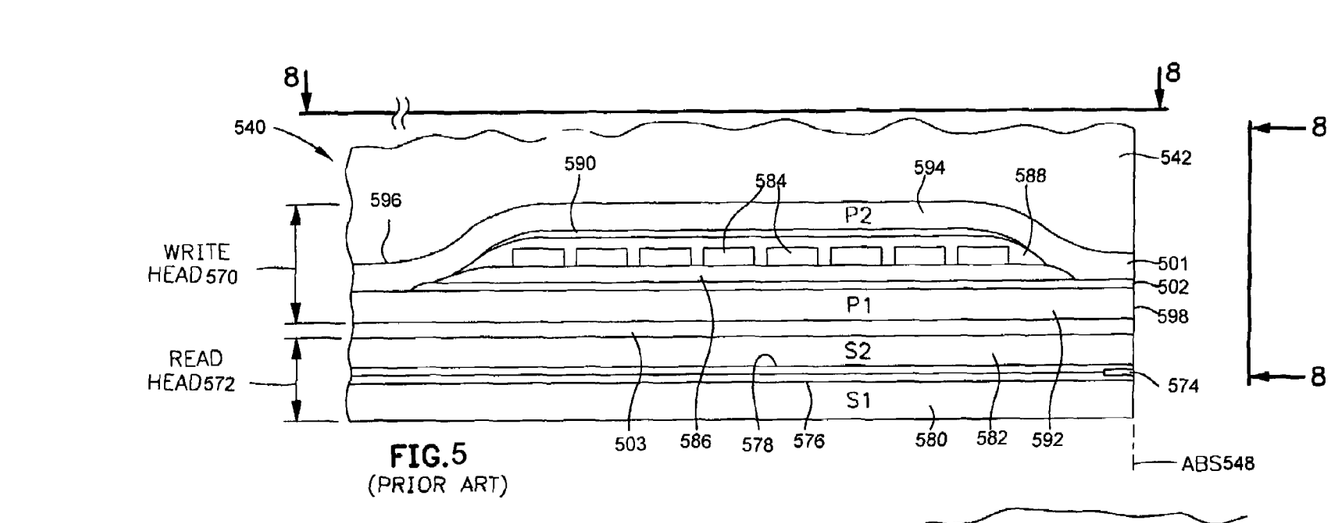
FIG. 5 is a side cross-sectional elevation view of a magnetic head.
Figure 6:
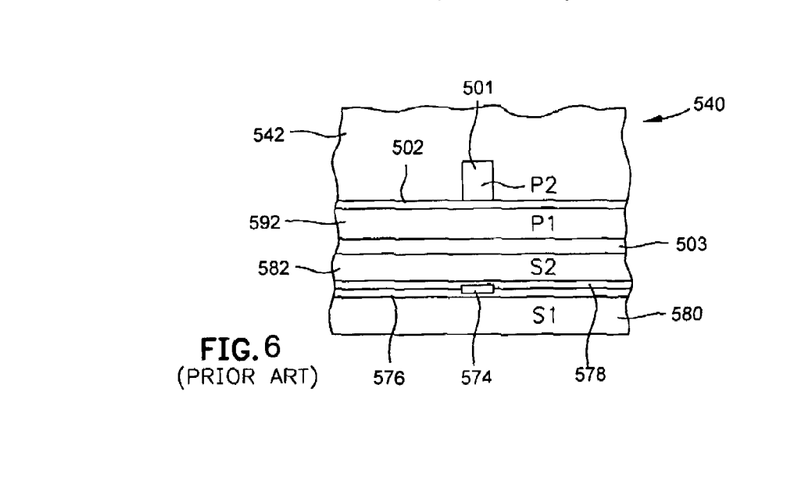
FIG. 6 is an air bearing surface (ABS) view of the magnetic head of FIG. 5.

FIG. 5 is a side cross-sectional elevation view of a magnetic head 540. Note that FIG. 5 does not show the details of the pole tip region. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. An insulation layer 542 is formed over the second pole piece layer 594. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

Figure 7:
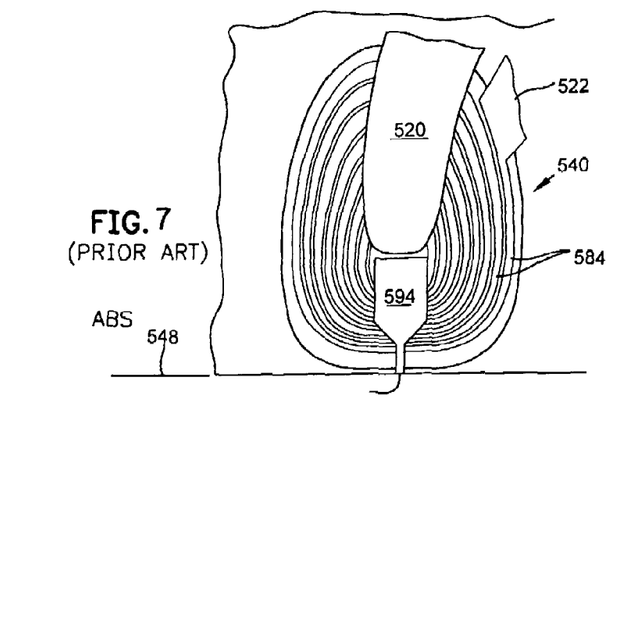
FIG. 7 illustrates the connect leads coupled to the coil for the write pole piece.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
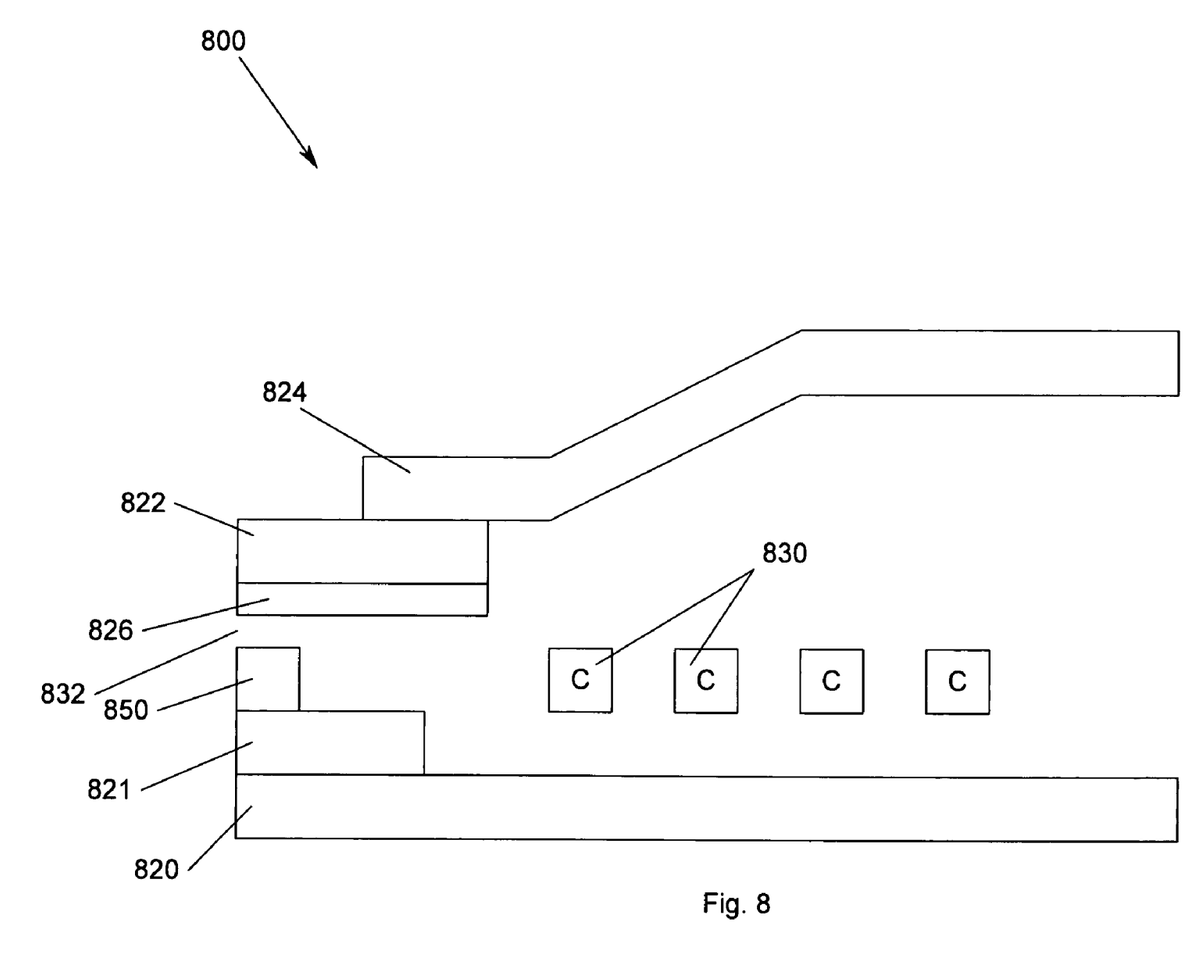
FIG. 8 is a diagram of a write configuration showing the details at the pole tip region.

FIG. 8 is a diagram of a write configuration 800 showing the details at the pole tip region. In FIG. 8, first pole 820, first pole pedestal 821, second pole 822, and third pole 824 layers are shown forming the write portion of the perpendicular head. The second pole layer 822 includes a conductive seed layer 826 deposited thereon. A coil 830 is formed between the first pole 820 and the second and third poles 822 and 824. Current through the coil 830 induces a magnetic field at the write gap 832.

A cap layer 850 is deposited over the first pole pedestal 821. The cap layer 850 defines the write gap and focuses the flux. However, one issue with the cap layer 850 is that it may be over saturated and thereby lose the ability to focus the flux to the center of a track. This would degrade the on-track writability and the unfocused flux may also cause adjacent track interference.

Figure 9:
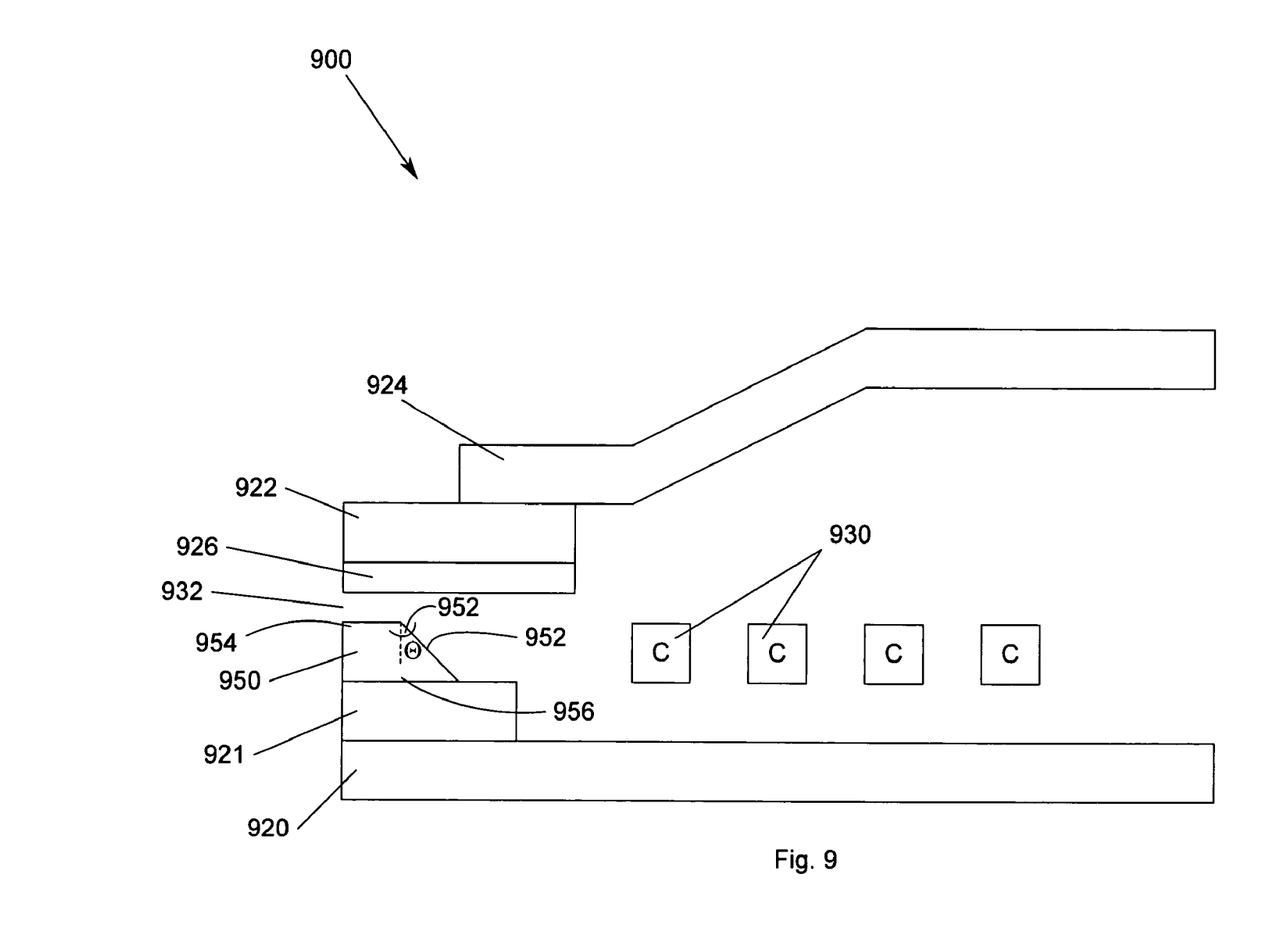
FIG. 9 is a diagram of a write configuration showing the details at the pole tip region according to an embodiment of the present invention.

FIG. 9 is a diagram of a write configuration 900 showing the details at the pole tip region according to an embodiment of the present invention. In FIG. 9, first pole 920, first pole pedestal 921, second pole 922, and third pole 924 layers are shown forming the write portion of the perpendicular head. The second pole layer 922 includes a conductive seed layer 926 deposited thereon. A coil 930 is formed between the first pole 920 and the second and third poles 922 and 924. Current through the coil 930 induces a magnetic field at the write gap 932.

A cap layer 950 is deposited over the first pole pedestal 921. The cap layer 950 is shaped to include a tail portion 952 that reduces saturation at the bottom of the cap. The narrow top 954 of the cap layer 950 is still used to focus the flux. However, the bottom 956 of the cap layer is wider, which make it less prone to over saturation. The tail portion 952 ensures that more flux will stay on the writing track. The tail structure is at an angle, $\theta$ 958, ranging between approximately 15° and 65°.

Figure 10:
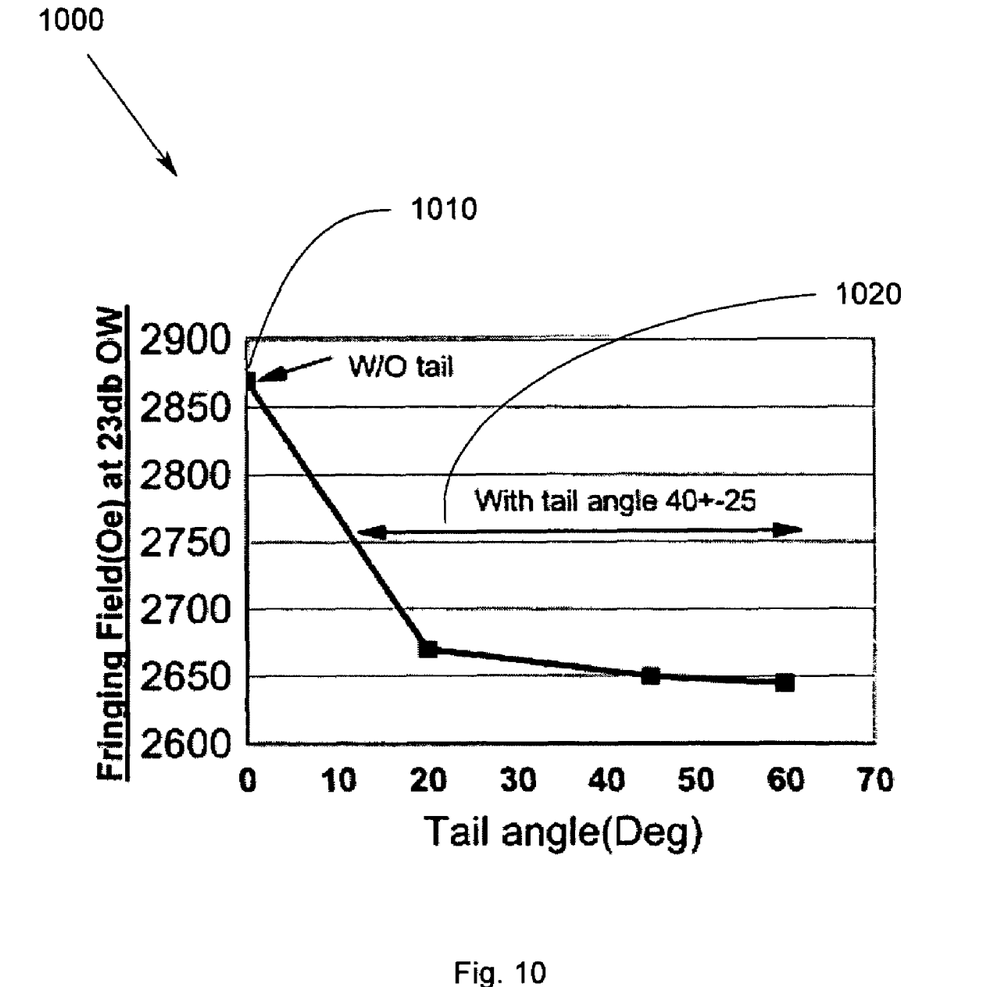
FIG. 10 is a graph of the normalizing fringing field verses the angle of the cap tail of a cap layer according to an embodiment of the present invention.

FIG. 10 is a graph 1000 of the normalizing fringing field verses the angle of the cap tail of a cap layer according to an embodiment of the present invention. The Finite Element Modeling (FEM) calculation of the fringing field at adjacent track is reduced by 200-250 Oe at a given overwrite (OW). This reduction reduces the risk of the adjacent track interference (ATI). Typically the fringing field needs to $\leq$75% $H_c$. For the $H_c$=3800, the fringing field needs to be $\leq$2780 Oe. A shift of 200 Oe would make head more robust against ATI, considering the geometry variation of a recording head may make the fringing field higher than modeled. As can be seen in FIG. 10, the cap layer with the tail produces a fringing field of approximately 2875 Oe 1010. In contrast, a cap layer having a tail with an angle that varies between 15° and 65° produces a fringing field of less than 2750 Oe 1020.

Figure 11:
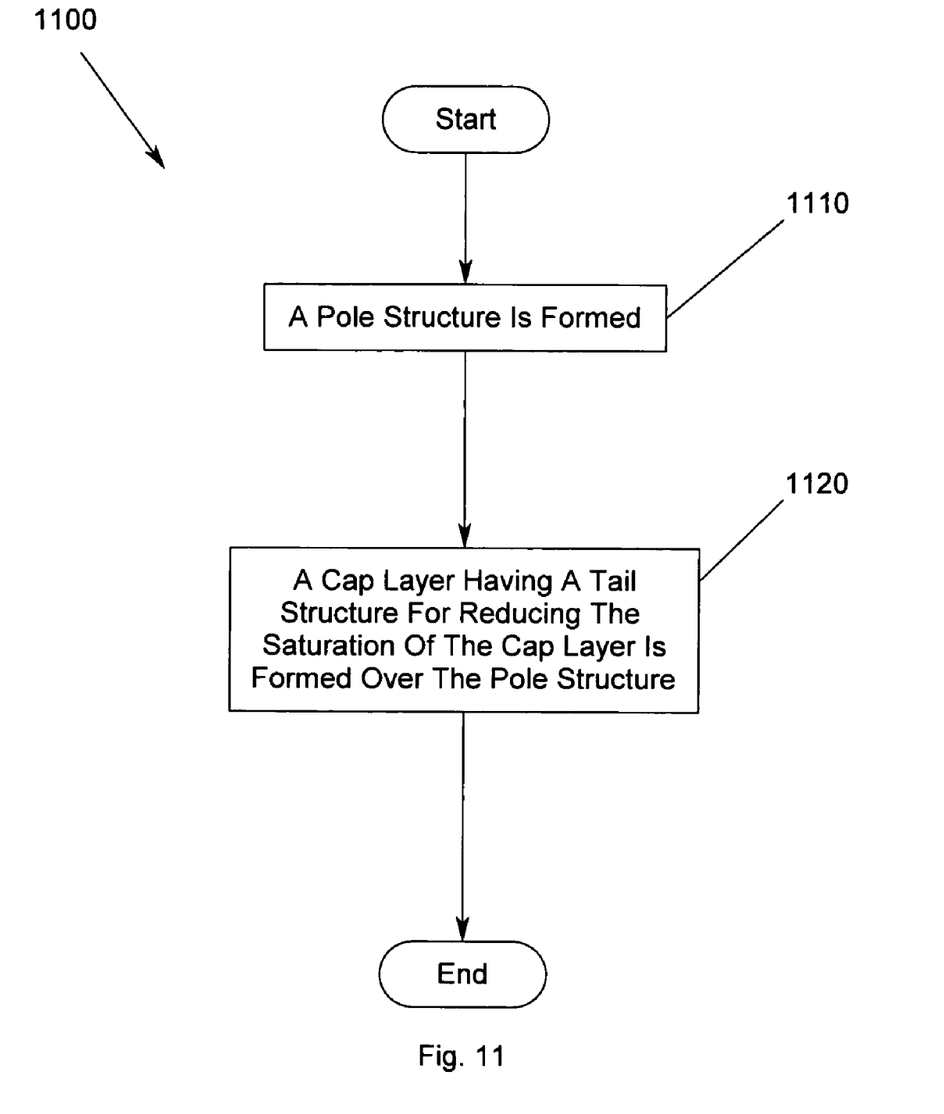
FIG. 11 is a flow chart of the method for providing a pole tip structure having a shape for preventing over saturation of the pole tip structure according to an embodiment of the present invention.

FIG. 11 is a flow chart 1100 of the method for providing a pole tip structure having a shape for preventing over saturation of the pole tip structure according to an embodiment of the present invention. In FIG. 11, a pole structure is formed 1110. A cap layer having a tail structure for reducing the saturation of the cap layer is formed over the pole structure 1120. The tail structure includes an angled surface that can vary between approximately 15° and 65°. The pole structure may be a first pole piece and a first pole pedestal as described in FIG. 9.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magnetic head, comprising:
    a read head including a read sensor disposed between a first and a second shield;
    a first planar write pole extending distally from an air bearing surface past a coil to a yoke region;
    a write pedestal, disposed on the first planar write pole, the write pedestal extending from the air bearing surface along only a portion of the first write pole;
    a third write pole disposed across a write gap from the first planar write pole, the third write pole extending from a point recessed from the air bearing surface past the coil toward the yoke region, the third write pole having three planar portions comprising a first planar portion parallel to the first planar write pole having a first end recessed from the air bearing surface and a second end further recessed from the air bearing surface, an angled planar portion having a first end extending from the second end of the first planar portion and angled away from the first planar write pole to a second end and a second planar portion parallel to the first planar write pole extending from the second end of the angled planar portion to the yoke regions;
    a second write pole coupled to the first planar portion of the third write pole, the second write pole extending from the air bearing surface and along only a portion of the first planar portion of the third write pole; and
    a cap formed on the write pedestal, the cap extending from the air bearing surface and along only a portion of the write pedestal and being configured as a trapezoid having first and second sides parallel, a third side parallel to the air bearing surface and a fourth side distal to the air bearing surface and angled to form a base touching the write pedestal that is wider than a top on a side opposite from the write pedestal and forming a first side of the write gap, wherein the base bottom is formed on the write pedestal and the base top forms a side of the write gap, wherein the configuration of the cap reduces saturation at a bottom of the cap while focusing write flux on a recording medium.

2. The magnetic head of claim 1, wherein the fourth side of the cap reduces saturation at the bottom of the cap.

3. The magnetic head of claim 1, wherein the base bottom of the cap touching the write pedestal being wider than the base tip of the cap to prevent over saturation of the cap.

4. The magnetic head of claim 1, wherein the fourth side of the cap provides greater flux on the writing track than if the fourth side was not angled.

5. The magnetic head of claim 1, wherein the fourth side of the cap provides a fringing field at an adjacent track, the angle of the fourth side is selected to reduce the fringing field by a predetermined amount at a given overwrite to prevent adjacent track interference.

6. The magnetic head of claim 1, wherein the fourth side of the cap is at an angle ranging between 15° and 65°.

7. The magnetic head of claim 1 further comprising a conductive seed layer disposed on the second write pole at the write gap.

8. The magnetic head of claim 1, where the coil is disposed between the first planar write pole and the third write pole for generating magnetic flux across the write gap.

9. A magnetic storage system, comprising:
    a magnetic storage medium having a plurality of tracks for recording of data; and
    a magnetic head maintained in a closely spaced position relative to the magnetic storage medium during relative motion between the magnetic head and the magnetic storage medium, the magnetic head further comprising:
        a read head including a read sensor disposed between a first and a second shield;
        a first planar write pole extending distally from an air bearing surface past a coil to a yoke region;
        a write pedestal, disposed on the first planar write pole, the write pedestal extending from the air bearing surface along only a portion of the first write pole;
        a third write pole disposed across a write gap from the first planar write pole, the third write pole extending from a point recessed from the air bearing surface past the coil toward the yoke region, the third write pole having three planar portions comprising a first planar portion parallel to the first planar write pole having a first end recessed from the air bearing surface and a second end further recessed from the air bearing surface, an angled planar portion having a first end extending from the second end of the first planar portion and angled away from the first planar write pole to a second end and a second planar portion parallel to the first planar write pole extending from the second end of the angled planar portion to the yoke regions;
        a second write pole coupled to the first planar portion of the third write pole, the second write pole extending from the air bearing surface and along only a portion of the first planar portion of the third write pole; and
        a cap formed on the write pedestal, the cap extending from the air bearing surface and along only a portion of the write pedestal and being configured as a trapezoid having first and second sides parallel, a third side parallel to the air bearing surface and a fourth side distal to the air bearing surface and angled to form a base touching the write pedestal that is wider than a top on a side opposite from the write pedestal and forming a first side of the write gap, wherein the base bottom is formed on the write pedestal and the base top forms a side of the write gap, wherein the configuration of the cap reduces saturation at a bottom of the cap while focusing write flux on a recording medium.

10. The magnetic storage system of claim 9, wherein the fourth side of the cap reduces saturation at the bottom of the cap.

11. The magnetic storage system of claim 9, wherein the base bottom of the cap touching the write pedestal being wider than the base tip of the cap to prevent over saturation of the cap.

12. The magnetic storage system of claim 9, wherein the fourth side of the cap provides greater flux on the writing track than if the fourth side was not angled.

13. The magnetic storage system of claim 9, wherein the fourth side of the cap provides a fringing field at an adjacent track, the angle of the fourth side is selected to reduce the fringing field by a predetermined amount at a given overwrite to prevent adjacent track interference.

14. The magnetic storage system of claim 9, wherein the fourth side of the cap is at an angle ranging between 15° and 65°.

15. The magnetic storage system of claim 9 further comprising a conductive seed layer disposed on the second write pole at the write gap.

16. The magnetic storage system of claim 9 further comprising a coil disposed between the first planar write pole and the third write pole for generating magnetic flux across the write gap.

17. A method for providing a pole tip structure having a shape for preventing over saturation of the pole tip structure, comprising:
    forming a first shield layer;
    forming a read sensor above the first shield layer;
    forming a second shield layer over the read sensor;
    forming a first planar write pole extending distally from an air bearing surface past a coil to a yoke region;
    forming a write pedestal on the first planar write pole and extending from the air bearing surface along only a portion of the first write pole;
    forming a third write pole, across a write gap from the first planar write pole, the third write pole extending from a point recessed from the air bearing surface past the coil toward the yoke region, the third write pole having three planar portions comprising a first planar portion parallel to the first planar write pole having a first end recessed from the air bearing surface and a second end further recessed from the air bearing surface, an angled planar portion having a first end extending from the second end of the first planar portion and angled away from the first planar write pole to a second end and a second planar portion parallel to the first planar write pole extending from the second end of the angled planar portion to the yoke regions;
    forming a second write pole coupled to the first planar portion of the third write pole, the second write pole extending from the air bearing surface and along only a portion of the first planar portion of the third write pole; and
    forming a cap on the write pedestal, the cap extending from the air bearing surface and along only a portion of the write pedestal and being configured as a trapezoid having first and second sides parallel, a third side parallel to the air bearing surface and a fourth side distal to the air bearing surface and angled to form a base touching the write pedestal that is wider than a top on a side opposite from the write pedestal and forming a first side of the write gap, wherein the base bottom is formed on the write pedestal and the base top forms a side of the write gap, wherein the configuration of the cap reduces saturation at a bottom of the cap while focusing write flux on a recording medium.

18. A magnetic head, comprising:
    means for reading magnetic signals including sensor means disposed between first and second means for shielding the sensor means;
    first write means for carrying a write current, the first write means being planar and extending distally from an air bearing surface past a coil to a yoke region;
    second write means, disposed on the first write means, for providing a write pedestal and extending from the air bearing surface along only a portion of the first write means;
    third write means, disposed across a write gap from the first write means, the third write means extending from a point recessed from the air bearing surface past the coil toward the yoke region, the third write means having three planar portions comprising a first planar portion parallel to the first write means having a first end recessed from the air bearing surface and a second end further recessed from the air bearing surface, an angled planar portion having a first end extending from the second end of the first planar portion and angled away from the first write means to a second end and a second planar portion parallel to the first write means extending from the second end of the angled planar portion to the yoke regions;
    fourth write means, coupled to the first planar portion of the third write means, the fourth write means extending from the air bearing surface and along only a portion of the first planar portion of the third write means; and
    fifth write means, formed on the second write means, for defining the write gap and focusing write flux on a recording medium, the fifth write means extending from the air bearing surface and along only a portion of the second write means and being configured as a trapezoid having first and second sides parallel, a third side parallel to the air bearing surface and a fourth side distal to the air bearing surface and angled to form a base touching the second write means that is wider than a top on a side opposite from the second write means and forming a first side of the write gap, wherein the base is formed on the second write means and the top forms a side of the write gap.

* * * * *